March 1, 1960 C. W. WILKINS 2,926,829
CLEAVABLE RELEASE COATING
Filed April 7, 1958
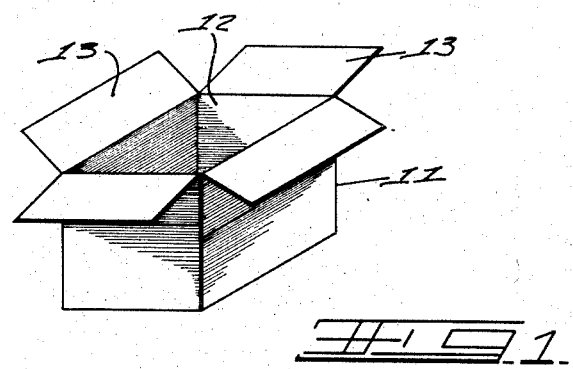
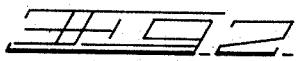
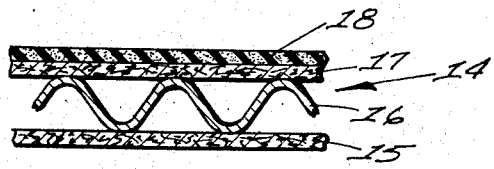
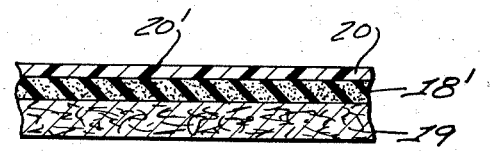
INVENTOR
Colbert W. Wilkins
BY Paul F. Stutz
W. A. Schaich
ATTORNEYS – # United States Patent Office 2,926,829
Patented Mar. 1, 1960

2,926,829

CLEAVABLE RELEASE COATING

Colbert W. Wilkins, Toledo, Ohio, assignor to Owens-Illinois Glass Company, a corporation of Ohio Application April 7, 1958, Serial No. 726,826

16 Claims. (Cl. 229—3.5)

The present invention relates to a coating composition, and particularly to such coating composition adapted for application to the inside surface of walls of containers fabricated of fiber board or corrugated board, and to such containers having coatings on the inner wall.

It is a general object of the present invention to provide a coating which exhibits release characteristics with respect to contents and, at the same time, exhibits cleavage characteristics. The more specific objects include: the provision of coating and coating compositions which are effective in decreased thickness; which are highly heat-resistant both in that the coating itself is not adversely affected by high temperatures, and in that the container itself is protected from damage from high temperatures of the contained material by the coating; which do not crack or peel away from the material forming the container wall; which are easily applied to the container wall material; which permit rolling or sticking of coated material on itself with a minimal sticking of the coated face to the next layer of material; which do not undesirably contaminate the product which is desirably packaged in the container; and which accomplish the foregoing with a minimum amount of the coating.

It is an additional object of the present invention to provide a container for hot molten asphaltic substances and the like.

In my copending application Serial No. 589,809, filed June 6, 1956, which is assigned to the same assignee as the present application, I have disclosed and claimed a cleavable coating which is composed of mica particles dispersed in a polymerized synthetic resin binder material, and, further, including solid particles which may be clay, fuller's earth, lamp black, flake graphite, green slate, carbon black and talc, and mixtures thereof. The present invention represents in part an improvement over such cleavable coatings.

In general, my present invention contemplates the discovery that an improved coating exhibiting cleavage and release characteristics may be prepared by combining a polysiloxane resin and one of a group of fillers. The silicone component of the composition apparently provides a release or anti-stick function whereby the tendency of the contained material to adhere to the coated wall is materially reduced. At the same time, the filler component of the composition provides internal cleavage phenomena whereby the coating may, as implied, actually cleave within itself so that a portion thereof adheres to the contents, and the remainder remains adhered to the container wall. The combination of these two functions provides a coating which is improved over any other known heretofore.

The invention finds special applicability to the art of packaging asphalt and other materials which present similar packaging problems, as for example, resins, bitumens, latex, and the like, such as may be termed meltable gummy solids. Materials of this type are conventionally melted at elevated temperatures (above 170° F.) and, while molten, poured into containers for cooling and solidification. Thereafter, the packaged substance is shipped to the consumer. It has been found that cartons and drums fabricated of heavy fiber board and the like or of corrugated board are desirably used for this purpose because of the relative inexpensiveness of the basic material of construction, e.g., paper.

It will be understood, of course, that wooden barrels and boxes are sometimes used for this purpose, as well as steel drums, and the compositions of this invention would possess utility in combination with such constructions, as well as with the paper containers to which reference will be had principally in describing the present invention.

The removal of the asphaltic or gummy solid material from containers, as described, presents serious problems. Chief among these is the fact that it is nigh on to impossible to separate the contents from the container in a satisfactory manner. Thus, almost always, the solidified core will be found to have adhered thereto portions and strips of the container material. It is also found that the surface of the removed contents will contain a deleterious amount of contaminating substances such as dirt, dust, paper and wood waste, and the like.

In order to overcome these shortcomings, coating mixtures for the inside surfaces of the containers have heretofore been proposed, among which are, for example, wax emulsions containing typically bentonite emulsifying agents and graphite, and various starch-containing mixtures. Unfortunately, the prior art coatings had to be applied in appreciable quantities to give the desired protection. Furthermore, the known coatings have been subject to cracking and peeling away from the wall, and necessitating, therefore, great care in handling. In addition, the prior art coatings have been difficult and expensive to apply, and often actually ineffective for the intended purpose. In addition, many of these coatings have actually been destroyed by the hot materials whereby the container is subject to contact with the hot molten contents with resultant leakage. Silicone materials in and of themselves have been suggested as possible release materials; however, experience has shown that the available silicones are impractical and undesirable for several reasons. In the first place, it is found that whether they be in the form of an aqueous emulsion or dissolved in a solvent they readily penetrate the board and are absorbed therein. As a result of this, it is found that a molten asphaltic material will soak entirely through the solid fiber container before solidifying, and thus making the container unseparable from the solidified asphaltic core. In addition, an attempt to overcome the foregoing necessitates the use of an exorbitant amount of these silicones, whereby the cost is prohibitively high.

The novel features believed characteristic of the present invention are recited in the appended claims. The invention itself, both as to the preferred embodiments and the method of operation, together with objects in addition to those set forth hereinbefore, will be understood by those skilled in the art by referring to the following description, taken in conjunction with the accompanying drawing, in which:

Fig. 1 is an isometric view of a container of a type useful in this invention.

Fig. 2 is a fragmentary sectional view of a portion of a container wall formed of corrugated board and having a coating thereon in accordance with this invention.

Fig. 3 is a fragmentary sectional view of a portion of a container wall formed of fiber board and having a double coating thereon in accordance with a modification of this invention.

Fig. 4 is a view similar to that of Fig. 3, and showing the double coating applied in reverse order in accordance with a further modification of this invention.

In Fig. 1, there is disclosed a container 11 which may be formed of heavy fiber board or corrugated board, and being adapted to contain asphalt or the like. In accordance with the present invention, the inner walls 12 of the container are coated with a coating (to be described) whereby the container may be torn away from a contained hard block of asphalt when it is desired to use the asphalt, as at a construction site. Foldable flaps 13 are also preferably coated with the coating according to this invention.

The container may typically be formed of corrugated board 14, as shown in Fig. 2. The corrugated board is formed of an outer liner sheet 15, an inner fluted corrugated medium 16, and an inner liner sheet 17. These components are adhesively secured together in a manner well known in the art. The inner liner sheet 17 carries a coating 18 comprising, as later described in detail, a polysiloxane binder having small solid particles dispersed therein. The coating 18 may, in a preferred embodiment, include a synthetic resin binder material of the type disclosed in my application Serial No. 589,809, referred to hereinbefore.

Fig. 3 discloses the utilization of solid kraft fiber board 19 as the wall former of the container. This board carries adhered thereto a coating 18' which is the same as coating 18 in Fig. 2. Over the coating 18' is applied a second layer or coating 20 which may comprise a synthetic resin binder material having small solid particles dispersed therein. The exposed coating surface 20' has characteristic tackiness at least at elevated temperatures and bonds or adheres to the material to be contained by the container.

Fig. 4 likewise discloses the utilization of a sheet of solid kraft paperboard 19' as the wall former of the container 11. The sheet bears a coating 20" and an overcoat 18". These coatings are identical to the coating 20 and 18', respectively, disclosed in Fig. 3, but laid down in reverse order. In other words, the synthetic resin binder containing small particles dispersed therein is the intermediate coat, and the polysiloxane binder coat having solid particles dispersed therein becomes the innermost coating, and, consequently, will contact the contents of the container 11.

I have found that modifications according to the foregoing produce containers which are more desirably adapted for the purpose intended than known heretofore, and, in addition, represent a distinct improvement over the coatings disclosed by application Serial No. 589,809. Of primary significance is the fact that coatings in accordance with the present invention require substantially less materials with consequent savings. In addition, combinations of coatings disclosed herein with coatings in accordance with my former invention are very distinctively advantageous.

Reference may now be had to the following recitation of examples which illustrate the significant features of the present invention and the combination thereof with coatings in accordance with my former invention.

*Example I*

|  | Liquids | Solids | Function |
| --- | --- | --- | --- |
| water | 80 |  | base fluid carrier. |
| polyphosphate (water solution) | 2.6 | 0.4 | wetting agent. |
| calcium stearate |  | 1.0 | slurry stabilizer. |
| carbon black (water dispersion) | 4.0 | 4.0 | coloring and cleavage. |
| green slate |  | 55 | cleavage. |
| talc (325 mesh) |  | 39 | Do. |
| muscovite mica (1000 mesh) |  | 25 | Do. |
| acrylic resin (water emulsion) | 7.8 | 5.2 | binder. |
|  | 94.4 | 129.6 |  |

In the formula of Example I, the water acts as a carrier for the solids and the polyphosphate and calcium stearate dissolve in the water, the resin binder emulsifies in the water, and the carbon black, green slate, talc and mica comprise discrete solid particles in the slurry, suspended in the water. The amount of water is, of course, variable to provide a more dense or less dense slurry, with more or less flow, as required in the particular method of applying the coat, and as may be appropriate to drying time and method, although sufficient water should be included to carry the solid particles in free suspension. The water dries from the finished coating, and in the slurry the water serves primarily as a medium for retaining the other materials in mechanically spreadable form or condition.

The amount of polyphosphate is governed primarily by the amounts and nature of the solid particles which must be wetted to provide a suspension. Accordingly, in Example I, sufficient polyphosphate is included to insure wetting of the carbon black, green slate, talc and mica particles. It should be understood that in the preparation of slurries in accord with this invention, only a sufficient amount of wetting agent should be employed to decrease the surface tension of the water to the point at which substantially all of the solid particles become wetted. The polyphosphate wetting agent actually employed in the formula of Example I was a mixture of hexametaphosphate and heptametaphosphate, but sodium hexometaphosphate, sodium salt of alkyl aryl sulfonate plus sulphate, polyhydroxyalcohol, ammonia, and certain sulphates and phosphates of higher synthetic alcohol have been found entirely satisfactory when used alone or in combination of two or more, in approximately equivalent quantities, that is, quantities that provide approximately the same reduction in surface tension of the solution. Since certain grades and sizes of the solids employed in the formula may be more or less difficult to wet, it is appropriate to increase or decrease the amount of wetting agent accordingly as is well known in the art. It will be understood that the wetting agents mentioned are typical, and that these or other wetting agents compatible with the other materials of the slurry may be employed as desired in the formula of Example I and in the slurries hereinafter specified.

To prepare a coating composition in accord with the formula given above, the wetting agent or agents are first added to the proper amount of water, with slow agitation, and the carbon black is next added. With the addition of the green slate, mica, and talc, the speed of the agitator is increased to between about 600 to 1000 r.p.m. for a commercial agitator, thereby to provide thorough mixing and smooth consistency. Finally, the binder material is added with continued high speed agitation. A certain amount of foam is normally to be expected and this foam is preferably reduced or eliminated by spraying with anti-foaming agents, such as a sulfonated oil or a naphtha. The amount of anti-foaming agent required will be negligible, has been found not to affect the final coating in any noticeable way, and its use is advisable only for making the handling of the slurry more convenient and to eliminate the waste and extra handling which would otherwise result from mechanical removal of the foam.

Coating material prepared in the specified manner in accord with the formula of Example I was spread by flowing on the upper surface of a length of corrugated kraft fiber board, the board being fed under a wiper roll to limit the coating thickness. The coating material thickness was such as to contain substantially 8–10 pounds dry weight of material per one thousand square feet of coated surface. After drying for approximately two minutes at 300° F. and conditioning at 72° F. at 50% relative humidity for two hours, the coating solids were measured, the coated fiber board was formed into containers, and the containers were filled with dead-level asphalt at about 400° F. The filled containers were then held for two hours at 250° F. and thereafter permitted to cool. At atmospheric temperatures thereafter the containers were torn away from the solid asphalt blocks which had formed inside. The fiber board came away readily and completely from the asphalt and the inner surface of the container walls was found to be still covered by a film of the coating. Even at corners of the container, no fibers of the kraft paper board had become adhered to the asphalt. The surfaces of the asphalt block were a dull, very dark gray, almost black, indicating that a portion of the coating had become bonded to and remained on the asphalt.

The foregoing example represents a preparation of a coating composition in accordance with my prior invention filed as patent application Serial No. 589,809.

*Example II*

|  | Parts |
|---|---|
| Water | 75 |
| Colloidal graphite (50% dispersion) | 5 |
| Silicone[1] water emulsion (40% solids) | 12 |

[1] The silicone was purchased from the Dow-Corning Corporation, and was composed of a mixture of (1) a copolymer of trimethyl siloxane and methyl hydrogen siloxane, and (2) hydroxylated methyl polysiloxane having viscosity less than 1,000,000 cs. and having an average of from 1.98 to 2 inclusive methyl radicals per silicon atom.

The above ingredients were intimately mixed together with a minor amount of lead 2-ethylhexoate. This latter is a curing catalyst. The resulting graphite-filled and catalyzed polysiloxane liquid was laid down on a sheet of Fourdrinier kraft fiber board in such amount that there was present 0.5 lb. of coating solids per 1,000 square feet of surface of fiber board. The coated board was dried at about 200° F. to cure or set the coating. It was found that the board bearing this coating was admirably suited to be utilized as a container for hot dead-level asphalt. The coating was not damaged when the hot molten asphalt was placed in contact therewith, and, consequently, the fiber board was not damaged. Furthermore, upon cooling and solidification of the asphalt, it was found that the paper board was readily completely strippable from the solidified core of asphalt. Examination revealed the core to be free of any paper. It will be noted that with the coating composition of Example I, there was required a coating of such thickness as to constitute 8 lbs. to 10 lbs. of coated material per 1,000 square feet of coated surface, whereas the coating of the present example requires only 0.5 lb. of coating. If desired, the graphite in the preceding formulation may be increased to as much as 20 parts. In place of the named catalyst, one may use zinc or iron octoate.

*Example III*

The coating of Example II may be additionally utilized according to this invention as an overcoat in the manner disclosed in Fig. 3. In this modification, a coat of a formulation according to Example I is laid down on the coated board of Example II in such amount that it constitutes about 4 lbs. of solids per 1,000 square feet of container surface. The advantages of this two-layer coating are manifold, as it will be seen that about one-half as much of the cleavable coating of Example I is required. This may be in part effected by the fact that the silicone undercoat may form a barrier which prevents impregnation of the overcoat into the fiber board itself. In any event, it is found that the wall of the container is very readily stripped from the core of solidified asphalt contained therein. Another advantage of this double coat embodiment is found in the fact that the coated sheet or board can be exposed to more rigorous drying conditions without increasing the brittleness of the sheet. This, of course, speeds up production substantially.

*Example IV*

A coating composition of the type disclosed in Example II was laid down on a sheet of fiber board in such amount that it constituted $\frac{1}{10}$ lb. of solids per 1,000 square feet of coated surface. This coating was dried in the usual fashion and an additional coating of a formulation according to Example I was laid down in such amount that it constituted 4 lbs. per 1,000 square feet of container surface. The double coated board was formed into a container, and hot molten dead-level asphalt was added. After cooling and solidification and simulated storage conditions, it was found that the coated board stripped easily and completely from the core of asphalt. Additional multi-coats of the silicone and cleavable type have been carried out with varying amounts. As little as 1 lb. solids per 1,000 square feet of cleavable coating has been successfully applied to an undercoat of silicone laid down in an amount of $\frac{1}{10}$ lb. of solids per 1,000 square feet of coated surface, yet yielding a completely satisfactory container for the purpose intended.

I have found that certain other fillers may be utilized in accordance with this invention to replace in whole or in part the graphite filler component recited in Example II. In general, the fillers which may be so used of necessity must possess the following properties: The filler must have a plate-like crystalline structure, it must possess good heat-insulating characteristics and it must be of a very finely divided size, preferably of particle size of from 300 to 1,000 mesh. Examples of fillers which have been found to answer these requirements and which are suitable in forming coating compositions in conjunction with the silicone component are carbon black, graphite, kaolinite clay, and a mica, commonly referred to as muscovite mica. It has been unexpectedly found that these fillers cooperate in a synergistic fashion with the silicone component to yield the desirable coating composition of the invention. Muscovite type mica as employed in the coating compositions of this invention should be of very fine mesh. Thus, a fineness of about 1,000 mesh has been found to be entirely satisfactory. Somewhat larger particles, e.g., down to about 325 mesh, may be used, but a fineness of 1,000 and above are preferred, and even as fine as 3,000 mesh. Mica of the muscovite type is mined near Kershaw, South Carolina, and so is sold by Mineralite Sales Corporation and identified as Mineralite 4X (1,000 mesh), Mineralite 3X (325 mesh), and Mineralite 5X (3,000 mesh). This mica is characterized by the fact that its individual particles are of a scale-like crystalline shape. It is believed that this physical characteristic is closely tied in with the excellent cleavage characteristics exhibited by the coating under discussion. The chemical analysis of these mica flakes is approximately as follows:

|  | Percent |
|---|---|
| $SiO_2$ | 56.4 |
| $Al_2O_3$ | 29.6 |
| $K_2O$ | 6.9 |
| $CaO$ | 1.1 |
| $MgO$ | 0.4 |
| $Fe$ | 0.15 |
| $TiO_2$ | 0.5 |
| $P_2O_5$ | 0.05 |
| Loss on ignition | 2.5 |

The kaolinite clay mentioned above is of the flat plated crystal type such as is found at and mined near McIntyre, Georgia, and which is commercially available from Edgar Bros. Company, Metuchen, New Jersey, type ASP-900 (2 micron size particles) and type ASP-400 (3 micron size particles). It is found that this clay is superior to talc or other conventional clay materials. The conventional clays, of course, are needle-like or of indiscriminate crystal structure, whereas the kaolinite clays concerned have a particle shape such as reveals, under sufficient magnification, a rectangular contour, and thereby complying with the previously mentioned requirement of plate-like characteristics. In addition, it is found that the kaolinite clay has the desired heat-insulating characteristics and is available in the desired particle size. Obviously, of course, minor amounts of the more conventional fillers such as conventional clays, fuller's earth, slates, starches, and chalks may be included as extenders in the conventional sense of the word. However, they may not replace entirely the preferred filler system mentioned, inasmuch as they do not co-act synergistically with the siloxane component as mentioned hereinbefore, and as will be apparent from the following example.

*Example V*

A silicone water emulsion containing 40% solids and similar to that described in Example II (but containing no filler) was applied to fiber board in sufficient amount as to constitute 0.18 lb. of solids per 1,000 square feet of coated surface. The coating was dried at a temperature of 200° F. A container formed of such coated board was filled with hot molten asphalt, and the contents allowed to cool and solidify. It was found, unfortunately, that the coating did not permit the container to be satisfactorily stripped from the solidified core of asphalt. As a consequence, a material portion of the surface of the core of asphalt had adhered thereto at least a portion of the thickness of the kraft board in which the container was formed.

Another sheet of similar board was coated with the same silicone emulsion coating described just above, but in such amount that it constituted 0.41 lb. of solids per 1,000 square feet of coated surface. After drying in the same manner, a container was formed, and hot molten asphalt introduced therein. After cooling and solidification, it was found that the container walls could be readily stripped from the core of solidified asphalt, thus yielding a completely clean core of asphalt. Other experiments indicated that this represents the minimum amount of silicone which could be applied and which would permit easy and complete strippability of the container from the core.

*Example VI*

Another coating was prepared like that described in Example V, but adding thereto carbon black in such amount that it constituted 15% by weight of the total solids of silicone and carbon black. This composition was applied to a sheet of fiber board in such amount that it constituted 0.18 lb. of total solids per 1,000 square feet of coated surface. After drying in the same fashion as described hereinbefore, the sheet was formed into a container and filled with a hot molten asphalt. After the asphalt had been allowed to cool and solidify, it was found that the container could be readily and easily stripped from the core of solidified asphalt without leaving any of the container adhered thereto, and thus presenting a clean core to the consumer.

The foregoing Examples V and VI demonstrate the synergistic co-action between the carbon black and the silicone which permits the laying down of a relatively thin coating of the combination in contrast to the relatively thick coating (0.41 lb. per 1,000 square feet) which was required of a coating formed of a silicone alone. Almost identical results are obtained when mica, kaolinite clay, muscovite mica, or graphite are substituted for the carbon black.

The manner of applying the coating composition described to the fiber board or corrugated board is not deemed critical. Thus, a gravity coating arrangement may be utilized, recognizing, however, that for this purpose the formulation will be adjusted so as to yield a final composition which is flowable, e.g., having a viscosity somewhat resembling light oil. The foregoing formulations are illustrative of that which will yield such a readily flowable final composition. A thicker, more viscous composition may be applied to the board by the use of an air knife or wipe-off bar or roll. In addition, a satisfactory coating can be applied by utilizing a trailing blade coater. Furthermore, if the compositions are formulated to be slightly less viscous, the coating may be sprayed. Drying of the coated sheet or board is accomplished according to conventional drying procedures, as, for example, by passing the sheet or board into tangential contact with an internally steam-heated drum or roller.

The invention has been described particularly with reference to aqueous emulsion systems. This is in part due to the fact that solvent systems are attendant with certain hazards due to the volatility of the solvents and consequent flammability. In addition to this, however, as has been indicated, the solvent systems are disadvantageous because of their ready absorption into the interior of the board or sheet itself. However, where a two-coat coating in accordance with this invention is employed, the second or top coat could utilize a solvent system for the polysiloxane material or the synthetic resin binder material, if the danger of fire was not controlling. Thus, it will be appreciated that the first or lower coat would serve as a barrier and preclude absorption or penetration of the solvent into the board or sheet.

The silicone component of the composition of the present invention is obtainable from the Dow-Corning Corporation of Midland, Michigan. The silicone component is essentially a polysiloxane and, more particularly, a simple mixture of two different polysiloxanes. One of the polysiloxanes is characterized as a hydrocarbon soluble polysiloxane in which there is on the average from 0.5 to 1 silicon bonded H atoms per silicon atom, the remainder of the valences of silicone atoms being situated by oxygen atoms, alaphatic hydrocarbon radicals of less than 6 carbon atoms and up to on the average of 0.1 aryl hydrocarbon radical per silicone atom, there being an average of from 1.6 to 2.5 inclusive total hydrocarbon radicals and hydrogen atoms per silicone atom. Specific examples of such are methyl hydrogen polysiloxane, ethyl hydrogen polysiloxane, copolymers of methyl hydrogen polysiloxane and dimethylphenylsiloxane, copolymers obtained by cohydrolyzing diethyldichlorosilane, trichlorosilane and ethyldimethylchlorosilane, copolymers obtained by cohydrolyzing silicon tetrachloride, methyldichlorosilane, dimethyldichlorosilane and triethylchlorosilane, copolymers obtained by cohydrolyzing dimethylmonochlorosilane and ethyldichlorosilane, copolymers obtained by cohydrolyzing vinylmethyldichlorosilane, methyldichlorosilane and ethylmethyldichlorosilane, copolymers obtained by cohydrolyzing monomethylmonochlorosilane, trimethylchlorosilane and methyldichlorosilane, copolymers obtained by cohydrolyzing trimethylchlorosilane, dichlorosilane and dimethyldichlorosilane, and copolymers obtained by cohydrolyzing phenylmethylmonochlorosilane and methyldichlorosilane. Preferably, the siloxane should be substituted with methyl radicals and hydrogen atoms. The other polysiloxane is characterized as being hydroxylated and having a viscosity of 1,000,000 cs. and having an average of from 1.4 to 2 monovalent hydrocarbon atoms per silicone atom. Examples of hydrocarbon radicals are methyl, ethyl, propyl, amyl, vinyl, and allyl. By the term "hydroxylated" is meant that the polysiloxane fluid contained at least 0.02% by weight OH groups. The hydroxylated polysiloxane may be prepared by the method set forth in Hyde Patent 2,779,776. Briefly, this method comprises maintaining a siloxane in contact with certain monobasic aqueous acids in a closed system until a constant viscosity of the siloxane is obtained, and thereafter washing the siloxane free of acid. The materials obtainable from Dow-Corning may apparently range from 5% to 75% by weight of the first-mentioned polysiloxane, and from 25% to 95% by weight of the hydroxylated polysiloxane.

Exactly why the combination of the polysiloxanes described and the particular filler system therefor produce a coating composition of the desired and noted properties is not known. It would normally have been expected that the addition of fillers to a polysiloxane would exert a dilution effect in the manner normally encountered when one adds to a synthetic organic resinous material a conventional filler or group of fillers. Thus, it is conventional practice to utilize fillers in the manufacture of paints, molding materials, and the like in an effort to reduce the cost substantially with only a slight reduction in the properties of the virgin synthetic material. As demonstrated hereinabove, however, it is possible by the present invention to provide a coating composition which contains a particular filler, thereby lowering the cost while at the same time, for some unexplained reason, improving the end result over that obtainable with the virgin silicone component.

The following example demonstrates the preparation of a coating according to a further embodiment of the invention, and being composed of silicone, filler, and a polymerized synthetic resin binder as the essential components.

*Example VII*

| Ingredient | Parts by Weight | Function |
| --- | --- | --- |
| Water | 113 | Fluid Carrier. |
| Polyphosphate | 3 as 12% solution | Wetting Agent. |
| Tritar CF-10 (Rohm and Haas). | 1 | Emulsifier. |
| Carbon Black | 16 (50% solids) | Cleavage. |
| Muscovite Mica | 8 | Do. |
| Graphite | 10 Flake | Do. |
| Resin (Dow Latex 5127C) a copolymer of butadiene and styrene. | 15 (as 48% solids) | Binder. |
| Silicone Emulsion [1] | 6 (as 40% solids) | Binder and Release. |

[1] The silicone was purchased from the Dow-Corning Corporaton, and was composed of a mixture of (1) a copolymer of trimethyl siloxane and methyl hydrogen siloxane, and (2) hydroxylated methyl polysiloxane having viscosity less than 1,000,000 cs. and having an average of from 1.98 to 2 inclusive methyl radicals per silicon atom.

To prepare the above ingredients, the silicone (40% solids) was diluted with an equal part of water and set aside for later addition. Next, the wetting agents in desired amount were added to part of the water and mixed, followed by addition of the carbon black, mineralite mica, and graphite. When these had formed a dispersion, the latex binder was added, followed by the previously prepared diluted silicone emulsion. The silicone is prepared independently in order to avoid an undesirable thickening which will occur if it is immediately combined with the other components of the ultimate composition. It is observed that this preliminary preparation of the silicone ingredient permits the escape of what appears to be hydrogen gas. The formulation is preferably prepared in the manner described and, in particular, in connection with the sequence of the addition of the ingredients. The composition described constitutes a coating material which exhibits in one coating both cleavable characteristics and release characteristics. By cleavable is meant that the coating, after drying, will separate or cleave internally. By release is meant that the coating will exhibit the characteristics of non-adherence to the core of asphalt. The one-coat formulation described may be applied in a similar manner to that described hereinbefore to a sheet of heavy fiber board or to the liner sheet of corrugated board. When dried at 200° F. or higher, the coating cures satisfactorily to a solid state and the coating is non-stickable with respect to a board containing a like coating, and the board may be bent and rolled upon itself without cracking or peeling of the coating.

Where carbon black is used alone, the formulation defined above may be modified so as to include up to about 60 parts of carbon black. Where mica is substituted for the carbon black or this single coat coating according to this invention, it may amount to up to 34 parts, while the graphite in such a coat may range up to about 30 parts. Combinations of these may, of course, be used in amounts conforming to the foregoing.

The resinous binder may be increased to up to about 40 parts if an impervious film is desired, and, in addition, in place of the butadiene styrene type included in the formulation above, there may be substituted any of those polymerized synthetic resin binder materials disclosed in my copending application Serial No. 589,809. Thus, for example, the following materials may be used: polymerized acrylic acid, polymerized ethyl acrylate, polymerized methyl acrylate, polymerized methyl methacrylate, polymerized ethyl methacrylate and copolymerized mixtures thereof, and acrylonitrile-methacrylate copolymer, butadiene styrene copolymer, vinylidene chloride-vinyl chloride copolymer and polyvinyl acetate, and mixtures thereof. Preferably, the resins are so formulated that they exhibit tackiness at temperatures above about 170° F., but which at lower temperatures are substantially non-tacky.

While there has been disclosed with considerable detail certain preferred manners of performing this invention, it is not intended or desired to be solely limited thereto for, as hitherto stated, the procedure may be modified, the precise proportions of the materials utilized may be varied, and other materials having equivalent properties may be employed, if desired, without departing from the spirit and scope of the invention as defined in the appended claims.

I claim:

1. A coating composition for paper adapted to yield a composite package material which is easily separated from asphaltic substances and the like, said composition comprising an aqueous emulsion of silicone solids, said solids comprising a lower alkyl polysiloxane having bonded to a portion of the silicone atoms of said polysiloxane one of the group consisting of hydrogen atoms and hydroxyl group, and a finely divided filler having a plate-like crystalline structure.

2. A coating composition for paper adapted to yield a composite package material which is easily strippable from asphaltic substances and the like, said composition comprising (1) an aqueous emulsion of (a) a polysiloxane having bonded to a portion of the silicon atoms of said polysiloxane lower alkyl groups and hydrogen atoms, and (b) a polysiloxane having bonded to the silicone atoms of said polysiloxane lower alkyl groups and hydroxyl groups, and (2) a finely divided filler having a plate-like crystalline structure, and being essentially heat-insulating.

3. The composition of claim 1, wherein the filler is composed of at least one of those selected from the group consisting of carbon black, graphite, muscovite mica, kaolinite clay, and mixtures thereof.

4. The composition of claim 2, wherein the filler is composed of at least one of those consisting of carbon black, graphite, muscovite mica, kaolinite clay, and mixtures thereof.

5. The composition of claim 2, wherein (1) is an emulsion including (a) trimethyl end-blocked methylhydrogenpolysiloxane, and (b) a hydroxylated methylpolysiloxane having a viscosity of less than 1,000,000 cs.

6. The composition of claim 2, wherein the filler is carbon black.

7. The composition of claim 2, wherein the filler is muscovite mica.

8. The composition of claim 2, wherein the filler is kaolinite clay.

9. A composite packaging material for contact with hot flowable asphaltic substances and the like, and being characterized by integrity and being easily separable from said substance upon cooling and solidification, said material comprising a ply of paper and adhered thereto the coating composition of claim 1.

10. A composite packaging material for contact with hot flowable asphaltic compositions characterized by integrity and being easily separable from said composition upon cooling and solidification, said material comprising (1) a ply of paper, (2) a dried coating thereon comprising a mixture of (a) an aqueous emulsion of silicone solids comprising (i) an alkyl end-blocked hydrogen polysiloxane, and (ii) a hydroxylated polysiloxane having an R/Si ratio of about 1.4–2/1.0, where R signifies a hydrocarbon radical, and (b) a finely divided filler system selected from the following list and being chosen in an amount not exceeding the indicated weight percentage calculated as a weight percent of the total solids, if more than one of said fillers being present in said system, the amount of each being chosen in proportion to the maximum weight percent indicated for each: carbon black—50%, graphite—25%, muscovite mica—20%, and kaolinite clay—30%.

11. The material of claim 9, which includes an additional cleavable coating comprising plate-like shape mica particles of between 300 and 3000 mesh dispersed in a polymerized synthetic resin binder.

12. A composite packaging material for contact with hot flowable asphaltic substances and the like, and being characterized by integrity and being easily separable from said substance upon cooling and solidification, said material comprising a ply of paper-like material and adhered thereto a first layer of cleavable coating consisting essentially of plate-like shape mica particles of between 300 and 3000 mesh dispersed in a polymerized synthetic resin binder, and a second layer comprising the coating composition of claim 2.

13. A composite packaging material for contact with hot flowable asphaltic substances and the like, and being characterized by integrity and being easily separable from said substance upon cooling and solidification, said material comprising a ply of paper-like material and adhered thereto a first layer of cleavable coating consisting essentially of plate-like shape mica particles of between 300 and 3000 mesh dispersed in a polymerized synthetic resin binder, and a second layer comprising the coating composition of claim 3.

14. The material of claim 11, wherein said resin binder is selected from the group consisting of polymerized acrylic acid, polymerized ethyl acrylate, polymerized methyl acrylate, polymerized methyl methacrylate, polymerized ethyl methacrylate, and copolymerized mixtures thereof, and an acrylonitrile-methacrylate copolymer, butadiene-styrene copolymer, vinylidene chloride-acrylonitrile copolymer, vinylidene chloride-vinyl chloride copolymer, and polyvinyl acetate, and mixtures thereof.

15. The packaging material of claim 14, wherein the filler system comprises 15% by weight carbon black calculated on the basis of the weight of the total solids.

16. A packaging material as claimed in claim 11, bearing a filled silicone coating in such thickness as yields 0.1 lb. silicone solids per 1,000 square feet of coated surface, and a cleavable coating of such thickness as yields from about 4 lbs. to about 10 lbs. of solids per 1,000 square feet of coated surface.

References Cited in the file of this patent

UNITED STATES PATENTS

| | | |
|---|---|---|
| 2,757,159 | Hormats | July 31, 1956 |
| 2,838,472 | Lucas | June 10, 1958 |
| 2,854,424 | Solomon et al. | Sept. 30, 1958 |

FOREIGN PATENTS

| | | |
|---|---|---|
| 767,797 | Great Britain | Feb. 6, 1957 |